(12) United States Patent
Itagaki (10) Patent No.: US 8,428,851 B2
(45) Date of Patent: Apr. 23, 2013

(54) CONTROL DEVICE FOR A VEHICLE

(75) Inventor: Katsuhiko Itagaki, Hamamatsu (JP)

(73) Assignee: Suzuki Motor Corporation, Hamamatsu-shi (JP)

( * ) Notice: Subject to any disclaimer, the term of this patent is extended or adjusted under 35 U.S.C. 154(b) by 543 days.

(21) Appl. No.: 12/757,116

(22) Filed: Apr. 9, 2010

(65) Prior Publication Data

US 2010/0268431 A1    Oct. 21, 2010

(30) Foreign Application Priority Data

Apr. 16, 2009    (JP) .................................. 2009-099639

(51) Int. Cl.
  *G06F 19/00*    (2006.01)
(52) U.S. Cl.
  USPC ............................ 701/104; 701/110; 701/114
(58) Field of Classification Search .................... 701/36, 701/93, 97, 98, 95, 104, 110, 114; 180/170–179, 180/219
  See application file for complete search history.

(56) References Cited

U.S. PATENT DOCUMENTS

| 6,318,490 B1 * | 11/2001 | Laning .......................... 180/170 |
| 6,820,710 B2 * | 11/2004 | Fechner ........................ 180/170 |
| 7,315,779 B1 * | 1/2008 | Rioux et al. ................... 701/114 |
| 2007/0084658 A1 | 4/2007 | Yamazaki et al. |

FOREIGN PATENT DOCUMENTS

| EP | 0 687 588 | 12/1995 |
| EP | 2 011 728 | 1/2009 |
| JP | A-137016 | 8/1983 |
| JP | A-2001-246960 | 9/2001 |
| WO | 2007/146927 | 12/2007 |

OTHER PUBLICATIONS

European Search Report dated Sep. 14, 2010 for corresponding European Patent Application No. 10159820.9.

\* cited by examiner

*Primary Examiner* — Richard M. Camby
(74) *Attorney, Agent, or Firm* — Barnes & Thornburg LLP (57) ABSTRACT

There are provided an accelerator grip, a biasing unit connected to the accelerator grip, the biasing unit biasing the accelerator grip to rotate in one circumferential direction, and a restricting unit restricting rotation of the accelerator grip against the biasing unit for placing the accelerator grip to a predetermined opening degree, wherein the restricting unit releases restriction of the accelerator grip when a predetermined operational force or more in one circumferential direction is applied to the accelerator grip so as to excessively rotate the accelerator grip in one circumferential direction beyond the predetermined opening degree.

5 Claims, 5 Drawing Sheets

CONTROL DEVICE FOR A VEHICLE

CROSS-REFERENCE TO RELATED APPLICATION

This application is based upon and claims the benefit of priority from Japanese Patent Application No. 2009-099639, filed Apr. 16, 2009; the entire contents of which are incorporated herein by reference.

BACKGROUND OF THE INVENTION

1. Field of the Invention

The present invention relates to a control device for a vehicle including cruise control with an electronic throttle control system.

2. Description of the Related Art

Conventionally, a constant speed running control device for a motorcycle is known that automatically releases constant speed running control (cruise control) when a rider releases his/her hand from an accelerator grip during the constant speed running control (for example, see Patent Document 1 (Japanese Patent Laid-Open No. 58-137016)).

Also, a constant speed running control device for a motorcycle is known that automatically releases constant speed running control when a rider rotates an accelerator grip during the constant speed running control in addition to a brake operation and a clutch operation (for example, see Patent Document 2 (Japanese Patent Laid-Open No. 2001-246960)).

Techniques on cruise control of motorcycles have been conventionally developed, and a conventional constant speed running control device has been applied to a motorcycle including a cable throttle valve in which a throttle cable converts an operation amount of the accelerator grip into an opening degree of a throttle valve.

The conventional constant speed running control device fixes a position of a throttle pulley around which the throttle cable is wound or the throttle cable itself to maintain the opening degree of the throttle valve and performs cruise control when a predetermined switch such as a cruising vehicle speed set switch is operated while a motorcycle is running at a speed predetermined by a rider. Thus, the accelerator grip connected to the throttle valve via the throttle cable is also fixed in a position corresponding to the opening degree of the throttle valve.

In recent years, techniques on a so-called drive-by-wire motorcycle have been developed that includes an accelerator position sensor and electrically detects an operation amount of an accelerator grip to control an opening degree of a throttle valve.

A drive-by-wire electronic throttle control system does not include a throttle cable connecting the accelerator grip to the throttle valve. Thus, in the electronic throttle control system, the accelerator grip during cruise control is not fixed in a position corresponding to the opening degree of the throttle valve, but is generally placed in a fully closed position.

By such cruise control with the electronic throttle control system, even if a rider forgets the cruise control being performed because of careless driving or the like, and rotates the accelerator grip in a closing direction for deceleration, the accelerator grip has been already placed in the fully closed position and a further rotation operation cannot be performed. Thus, automatic release of the cruise control cannot be applied to the conventional constant speed running control device described in Patent Document 2. Then, a deceleration operation of the motorcycle during cruise control may be delayed.

SUMMARY OF THE INVENTION

In view of the circumstances described above, an object of the present invention is to provide a vehicle control device that configures an accelerator grip that can be excessively rotated in a further closing direction from a general fully closed position, and can detect excessive rotation of the accelerator grip to automatically release cruise control.

To achieve the above-described object, the present invention provides a control device for a vehicle including an electronic throttle control system comprising: an accelerator grip, an biasing unit connected to the accelerator grip, the biasing unit biasing the accelerator grip to rotate in one circumferential direction, and a restricting unit restricting rotation of the accelerator grip against the biasing unit for placing the accelerator grip to a predetermined opening degree, wherein the restricting unit releases restriction of the accelerator grip when a predetermined operational force or more in one circumferential direction is applied to the accelerator grip so as to excessively rotate the accelerator grip in one circumferential direction beyond the predetermined opening degree.

In preferred embodiments of the above aspect, the following modes may be provided.

It may be desired that a control unit, and an accelerator position sensor detecting a rotation amount of the accelerator grip, Wherein the accelerator position sensor outputs an excessive rotation signal to the control unit when the accelerator position sensor detects excessive rotation of the accelerator grip.

It may be desired that the control device for a vehicle including an electronic throttle control system according to claim 2, wherein the control unit performs cruise control to maintain a vehicle speed at a predetermined speed, and the control unit releases the cruise control when the excessive rotation signal is input from the accelerator position sensor.

It may be desired that the excessive rotation signal is a signal indicating excessive rotation of the accelerator grip in a closing operation over predetermined opening degree thereof.

It may be desired that the restricting unit includes: an accelerator pulley interlocked with the accelerator grip, a protrusion formed on the accelerator pulley, a stopper member against which the protrusion abuts when the accelerator grip is placed at the predetermined opening degree, the stopper member being swingable with excessive rotation of the accelerator grip, and a stopper biasing member having a biasing force larger than a biasing force of the biasing unit, the stopper biasing member applying a rotation biasing force in a direction opposite to a direction of the biasing force of the biasing unit via the stopper member to the accelerator pulley.

It may be desired that the regulation unit includes an opening degree adjustment unit that adjusts a swing amount of the stopper member and adjusts the predetermined opening degree of the accelerator grip.

It may be desired that a storage unit storing an output value of the accelerator position sensor, wherein the storage unit stores the output value as a fully closed position of the accelerator grip when the stopper member is in contact with the protrusion and the opening degree adjustment unit.

It may be desired that the control unit stores the output value of the accelerator position sensor as the fully closed position of the accelerator grip during cranking operation of the vehicle.

It may be desired that the control unit stores the output value of the accelerator position sensor as the fully closed position of the accelerator grip in case where the output value of the accelerator position sensor is smaller than a predetermined value.

It may be desired that an electric motor driven corresponding to an operation amount of the accelerator grip, and a throttle valve opened and closed by the electric motor, wherein the control unit controls the electric motor based on the output value of the accelerator position sensor.

As described above, a vehicle control device can be proposed that configures an accelerator grip that can be excessively rotated in a further closing direction from a general fully closed position, and can detect excessive rotation of the accelerator grip to automatically release cruise control.

The characteristics, operations and advantages of the present invention described above will be more apparently understood by the following description made to the preferred embodiment with reference to the accompanying drawings.

DETAILED DESCRIPTION OF THE PREFERRED EMBODIMENTS

An embodiment of a vehicle control device according to the present invention will be described with reference to FIGS. 1 to 6. It will be understood that the words describing directions, such as "upper", "lower", "left" and "right", or like terms, are used herein with reference to illustrated states in the drawings or in actually usable state of the vehicle control device.

Figure 1:
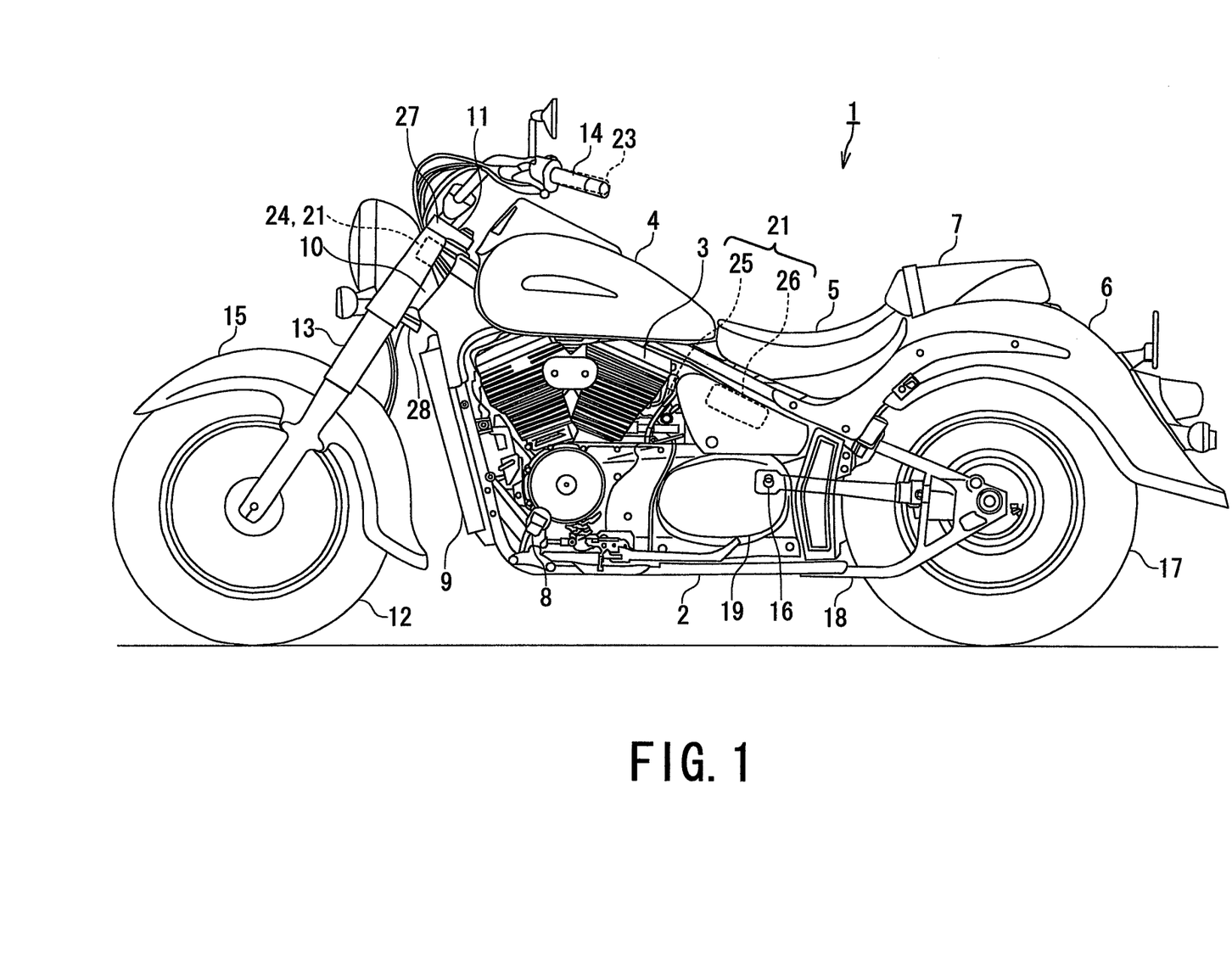
FIG. 1 is a left side view showing a motorcycle using a vehicle control device according to the embodiment of present invention.

FIG. 1 is a left side view showing a motorcycle using a vehicle control device according to the embodiment of present invention.

As shown in FIG. 1, a motorcycle 1 (vehicle) includes a vehicle body frame 2 mainly formed of a steel pipe into a double cradle shape. A front and rear two cylinder V-type engine 3 is mounted in a front half portion (double cradle portion) of the vehicle body frame 2, and a fuel tank 4 is placed in an upper portion of the vehicle body frame 2 so as to be located on the V-type engine 3. A seat 5 and a rear fender 6 are placed in order behind the fuel tank 4, and a pillion passenger seat 7 is provided on the rear fender 6. Pair of left and right steps 8 are provided near a lower front portion of the vehicle body frame 2, and a radiator 9 is provided on a front surface of the vehicle body frame 2.

A header pipe 10 is provided in a front head of the vehicle body frame 2. A pair of front fork 13 that supports a front wheel 12 via a steering head 11 is laterally rotatably journaled on the header pipe 10 together with a handlebar 14 and a front fender 15.

Meanwhile, a swing pivot shaft 16 is provided in a vehicle width direction in a lower middle portion of the vehicle body frame 2. A rear swing arm 18 that supports a rear wheel 17 is vertically rotatably journaled by the swing pivot shaft 16 in a rear half portion of the vehicle body frame 2. A rear wheel suspension system (not shown) is provided near a base of the rear swing arm 18. A shaft drive type secondary deceleration mechanism of the motorcycle 1 is used, and an output of the V-type engine 3 is transmitted via a transmission 19 to the rear wheel 17 by a drive shaft (not shown), for example, inserted in the rear swing arm 18.

The motorcycle 1 is of an American type with the handlebar 14 placed in a high position and the seat 5 placed in a low position.

The motorcycle 1 includes a vehicle control device 21. The vehicle control device 21 includes an accelerator position sensor 24 that detects an operation amount of an accelerator grip 23 of the handlebar 14, a throttle valve 25 opened and closed according to an output value of the accelerator position sensor 24, and an electric control unit 26 that drives to open and close the throttle valve 25 based on the output value of the accelerator position sensor 24. The accelerator position sensor 24 is placed in a portion surrounded by an upper bracket 27 and an under bracket 28 of the steering head 11 and the pair of front forks 13.

Figure 2:
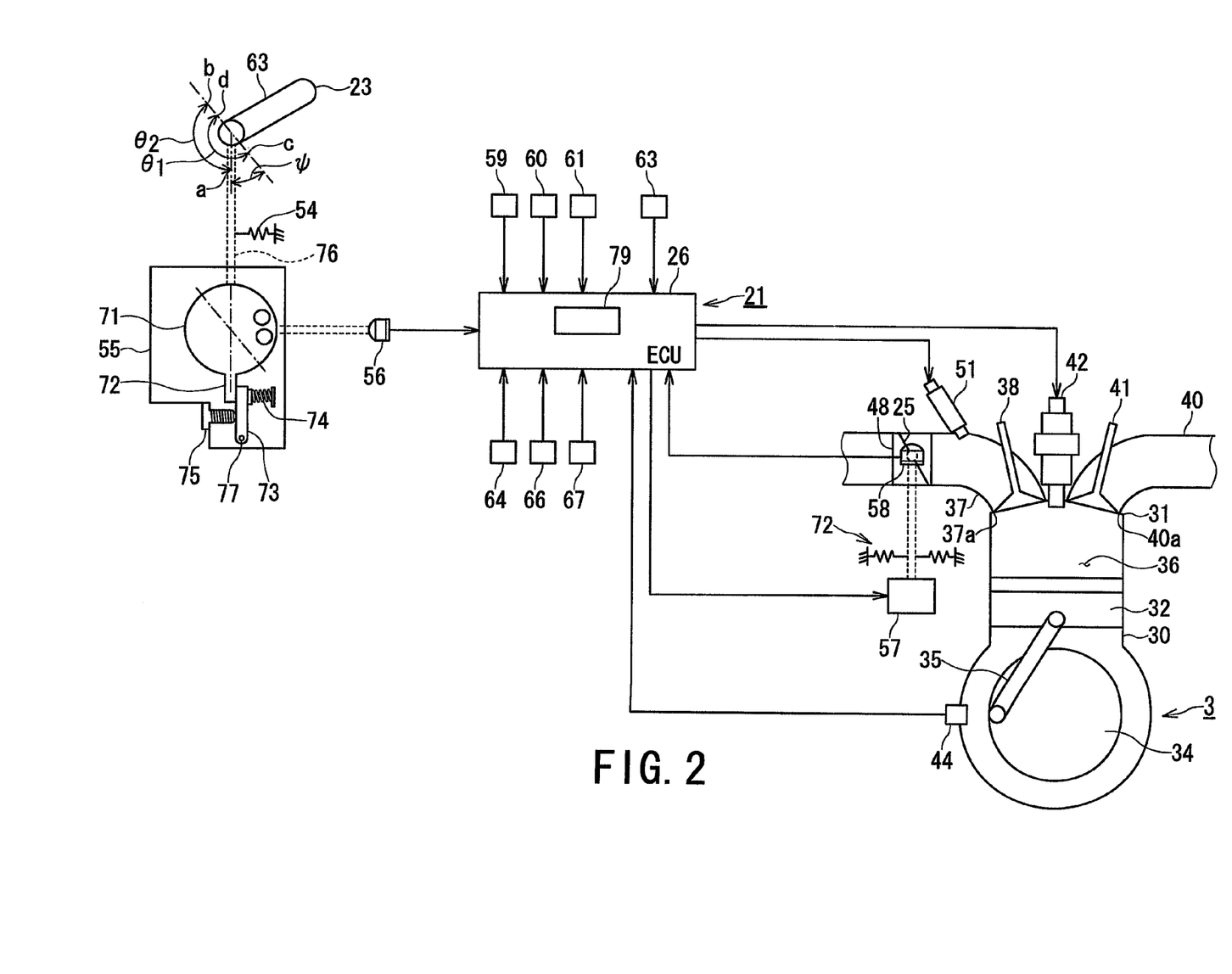
FIG. 2 is a schematic view showing the vehicle control device according to the embodiment of present invention and an engine.

FIG. 2 is a schematic view showing the vehicle control device according to the embodiment of present invention and the engine.

As shown in FIG. 2, the engine 3 includes a cylinder block 30, a cylinder head 31, a piston 32, a crankshaft 34, a connecting rod 35, a combustion chamber 36, an intake pipe 37, an intake valve 38, an exhaust pipe 40, an exhaust valve 41, an ignition plug 42, an engine RPM (Rotation Per Minute) sensor 44, and a throttle body 48.

The cylinder head 31 is secured to the cylinder block 30.

The piston 32 is reciprocatably housed in the cylinder block 30.

The crankshaft 34 is rotatably housed in the cylinder block 30.

One end of the connecting rod 35 is swingably connected to the crankshaft 34, and the other end thereof is swingably connected to the piston 32. The connecting rod 35 converts reciprocating motion of the piston 32 into rotary motion of the crankshaft 34.

The combustion chamber 36 is formed as a compartment between the piston 32 and the cylinder head 31.

The intake pipe 37 and the exhaust pipe 40 each communicate with the combustion chamber 36.

The intake valve 38 is provided in the cylinder head 31, and opens and closes an intake port 37a of the intake pipe 37.

The exhaust valve 41 is provided in the cylinder head 31, and opens and closes an exhaust port 40a of the exhaust pipe 40.

The ignition plug 42 is provided in the combustion chamber 36.

The engine RPM sensor 44 detects an RPM of the engine 3 from an RPM of the crankshaft 34.

The throttle body 48 is provided in the intake pipe 37. The throttle valve 25 is provided in the throttle body 48. The throttle valve 25 is opened and closed by the vehicle control device 21 according to an opening degree of the accelerator grip 23 provided on the handlebar 14.

Between the throttle valve 25 and the intake valve 38, an injector 51 as a fuel injection device is provided. The injector 51 is connected to a strainer (not shown) provided in the fuel tank 4, a fuel pump (not shown), and a pressure control valve (pressure regulator, not shown). The engine 3 is, for example, of an independent intake type, and the injector 51 is provided for each cylinder.

The vehicle control device 21 drives to open and close the throttle valve 25 according to the operation amount of the accelerator grip 23 (accelerator opening degree) and performs cruise control, and causes the motorcycle 1 to run at a speed predetermined by the rider. The vehicle control device 21 includes the accelerator grip 23, an accelerator return spring 54 (biasing unit), an accelerator grip excessive rotation mechanism unit 55 (restricting unit), an accelerator position sensor 56, an electric motor 57, the throttle valve 25, a throttle position sensor 58, a front brake switch 59, a rear brake switch 60, a clutch switch 61, a speed sensor 63, a cruise control standby switch 64, a cruising vehicle speed setting switch 66, a memory vehicle speed calling switch 67, and the electric control unit 26 (control unit).

The accelerator grip 23 is rotatably provided on the handlebar 14 in a predetermined first angle range θ1. The accelerator grip 23 is placed in a position corresponding to a fully closed state of the throttle valve 25 at one circumferential end a in a predetermined second angle range θ2 smaller than the predetermined first angle range θ1, and in a position corresponding to a fully opened state of the throttle valve 25 at the other circumferential end b. The second angle range θ2 corresponds to the accelerator opening degree of the accelerator grip 23. An angle formed by one circumferential end c in the predetermined first angle range θ1 and one circumferential end a in the predetermined second angle range θ2 is an excessive rotation range ψ, and a phase angle of the other circumferential end d in the predetermined first angle range θ1 matches a phase angle of the other circumferential end b in the predetermined second angle range θ2.

The accelerator return spring 54 rotationally biases the accelerator grip 23 to rotate in one circumferential direction, and returns the accelerator grip 23 to which an operational force is not input to the position corresponding to the fully closed state of the throttle valve 25.

The accelerator grip excessive rotation mechanism unit 55 restricts rotation of the accelerator grip 23 against the accelerator return spring 54, and places the accelerator grip 23 at a predetermined opening degree, for example, at one circumferential end a in the predetermined second angle range θ2, specifically, the position corresponding to the fully closed state of the throttle valve 25. The accelerator grip excessive rotation mechanism unit 55 releases restriction of the accelerator grip 23 when the rider of the motorcycle 1 applies, to the accelerator grip 23, a predetermined excessive rotation operational force F or more (a predetermined operational force or more) in one circumferential direction, that is, in a closing operation over predetermined opening degree thereof, and causes the accelerator grip 23 to enter the excessive rotation range ψ beyond the predetermined opening degree.

The accelerator grip excessive rotation mechanism unit 55 includes a protrusion 72 formed on an accelerator pulley 71, an accelerator pulley stopper 73 (stopper member), a stopper support spring 74 (stopper biasing member), and a fully closed adjustment screw 75 (opening degree adjustment member).

The accelerator pulley 71 is interlocked with the accelerator grip 23 via an accelerator wire 76. A rotation operation of the accelerator grip 23 causes the protrusion 72 to move with the accelerator pulley 71, and abut against the accelerator pulley stopper 73 when the accelerator grip 23 is placed in the fully closed position.

The accelerator pulley stopper 73 is a stopper in the fully closed position of the accelerator pulley 71, and swingably journaled on a support shaft 77.

The stopper support spring 74 applies a rotation biasing force in a direction opposite to a direction of the biasing force of the accelerator return spring 54, that is, in an opening direction via the accelerator pulley stopper 73 to the accelerator pulley 71. The stopper support spring 74 biases the accelerator pulley 71 with a larger biasing force than the accelerator return spring 54. The stopper support spring 74 is swung by the protrusion 72 and causes the accelerator grip 23 to enter the excessive rotation range ψ when the rider of the motorcycle 1 applies a predetermined excessive rotation operational force F or more in one circumferential direction, that is, in the closing direction is applied to the accelerator grip 23.

The fully closed adjustment screw 75 can adjust a swing amount of the accelerator pulley stopper 73 biased by the stopper support spring 74, and restrict a swing position of the accelerator pulley stopper 73 to adjust the fully closed position of the accelerator grip 23.

The protrusion 72 on the accelerator pulley 71, the accelerator pulley stopper 73, and the fully closed adjustment screw 75 are all made of a conductive material. When the accelerator grip 23 is placed in the fully closed position, conductive states of the protrusion 72 on the accelerator pulley 71, the accelerator pulley stopper 73, and the fully closed adjustment screw 75 are detected by the electric control unit 26.

The accelerator position sensor 56 detects an operation amount (accelerator opening degree) of the accelerator grip 23 via the accelerator pulley 71, and outputs the operation amount to the electric control unit 26. When the accelerator grip 23 enters the excessive rotation range ψ, the accelerator position sensor 56 detects excessive rotation of the accelerator grip 23 via the accelerator pulley 71, and outputs an excessive rotation signal to the electric control unit 26.

The electric motor 57 is driven by the electric control unit 26 corresponding to the operation amount of the accelerator grip 23 detected by the accelerator position sensor 56.

The throttle valve 25 is driven to be opened and closed by the electric motor 57.

The throttle position sensor 58 detects a throttle opening degree (actual opening degree) of the throttle valve 25 and outputs the opening degree to the electric control unit 26.

The front brake switch 59 detects ON/OFF of a brake operation of a front brake (not shown) and outputs the ON/OFF to the electric control unit 26.

The rear brake switch 60 detects ON/OFF of a brake operation of a rear brake (not shown) and outputs the ON/OFF to the electric control unit 26.

The clutch switch 61 detects ON/OFF of an operation of a clutch (not shown) and outputs the ON/OFF to the electric control unit 26.

The speed sensor 63 detects a vehicle speed of the motorcycle 1 and outputs the vehicle speed to the electric control unit 26.

The cruise control standby switch 64 outputs a standby signal for shifting to a state where the cruise control can be started to the electric control unit 26.

The cruising vehicle speed setting switch 66 outputs a cruising vehicle speed control start signal for starting the cruise control at the vehicle speed detected by the vehicle speed sensor 63 to the electric control unit 26.

The memory vehicle speed calling switch 67 outputs a memory vehicle speed calling control start signal for starting the cruise control at a vehicle speed when the previous cruise control is performed to the electric control unit 26.

The electric control unit 26 controls an operation state of the engine 3. Operation control of the engine 3 by the electric control unit 26 includes normal running control that controls the opening degree of the throttle valve 25 according to the rotation operation of the accelerator grip 23, and the cruise control. The electric control unit 26 controls to drive the electric motor 57 based on output values of the accelerator position sensor 56 and the throttle position sensor 58, and controls the operation state of the engine 3.

Specifically, the electric control unit 26 receives detection results, as control inputs, from the accelerator position sensor 56, the throttle position sensor 58, the engine RPM sensor 44, the front brake switch 59, the rear brake switch 60, the clutch switch 61, the speed sensor 63, the cruise control standby switch 64, the cruising vehicle speed setting switch 66, and the memory vehicle speed calling switch 67. The electric control unit 26 can also receive a detection result from a pressure sensor (not shown) that detects pressure in the intake pipe 37.

Meanwhile, the electric control unit 26 outputs control signals to a fuel pump, the injector 51, the ignition plug 42, and the electric motor 57 based on the control inputs. The electric control unit 26 is, for example, constituted by a microcomputer (not shown), and includes a storage unit 79.

First, for the normal running control, the electric control unit 26 calculates a target opening degree of the throttle valve 25 from an accelerator opening degree detected by the accelerator position sensor 56 and performs feedforward control (hereinafter simply referred to as FF control) of the engine 3. The target opening degree of the throttle valve 25 is a throttle opening degree to be reached by the throttle valve 25 according to the accelerator opening degree detected by the accelerator position sensor 56, and calculated, for example, by multiplying the accelerator opening degree by a predetermined coefficient, but may be calculated using an arithmetic expression other than multiplication or a predetermined two-dimensional table. The FF control searches a feedforward map preset according to the target opening degree of the throttle valve 25 and the engine RPM, and determines a target duty value of the electric motor 57 at which the target opening degree can be held. The feedforward map is a so-called three-dimensional map including the RPM of the engine 3, the target opening degree of the throttle valve 25, and the target duty value of the electric motor 57 at which the target opening degree can be held.

The electric control unit 26 further performs feedback control (hereinafter simply referred to as FB control) that converges the throttle opening degree of the throttle valve 25 to the target opening degree according to a deviation between the target opening degree (target value) of the throttle valve 25 calculated by the FF control and the throttle opening degree (control value) of the throttle valve 25 detected by the throttle position sensor 58.

Then, for the cruise control, when the electric control unit 26 receives the standby signal by the rider operating the cruise control standby switch 64, the electric control unit 26 shifts to the state where the cruise control can be started. Then, when the electric control unit 26 receives the cruising vehicle speed control start signal by the rider operating the cruising vehicle speed setting switch 66, the electric control unit 26 stores a vehicle speed detected by a vehicle speed sensor 78 at that time in the storage unit 79, opens and closes the throttle opening degree of the throttle valve 25, and controls the motorcycle 1 to a constant speed running state at the vehicle speed stored in the storage unit 79.

When the electric control unit 26 receives a memory vehicle speed calling control start signal by the rider operating the cruise control standby switch 64 and then operating the memory vehicle speed calling switch 67, the electric control unit 26 reads the vehicle speed in the previous cruise control stored in the storage unit 79, opens and closes the throttle opening degree of the throttle valve 25, and controls the motorcycle 1 to the constant speed running state at the vehicle speed stored in the storage unit 79. When the electric control unit 26 performs the cruise control, the motorcycle 1 runs at a constant speed irrespective of the accelerator opening degree detected by the accelerator position sensor 56. The rider does not need to operate the accelerator grip 23 during the cruise control, and can return the accelerator grip 23 to the fully closed position.

Further, when the electric control unit 26 receives a signal from any of the front brake switch 59, the rear brake switch 60, and the clutch switch 61 after the control in the constant speed running state is started, the electric control unit 26 automatically releases the cruise control and returns to the normal running control state.

Figure 3:
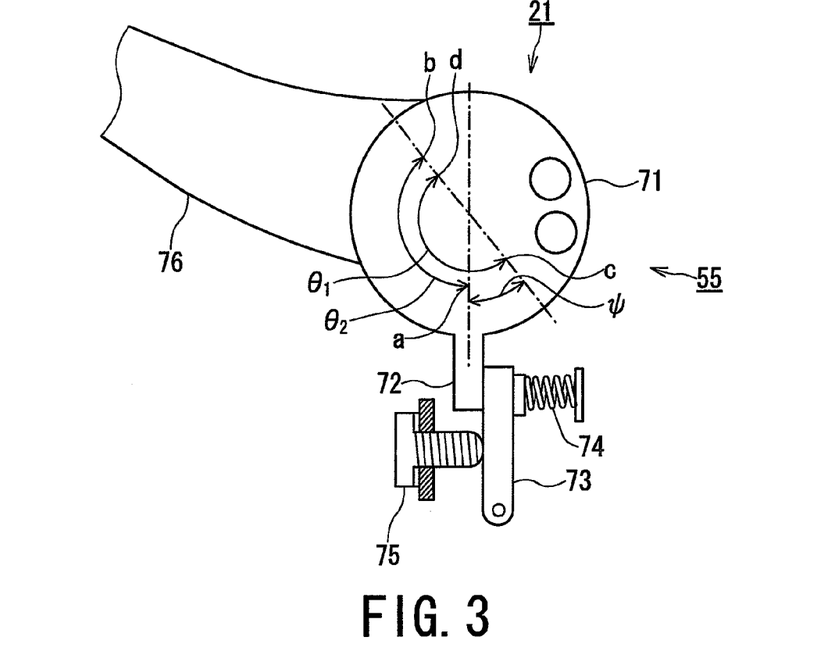
FIG. 3 is a view showing an accelerator grip excessive rotation mechanism unit of the vehicle control device according to the embodiment of present invention.
Figure 4:
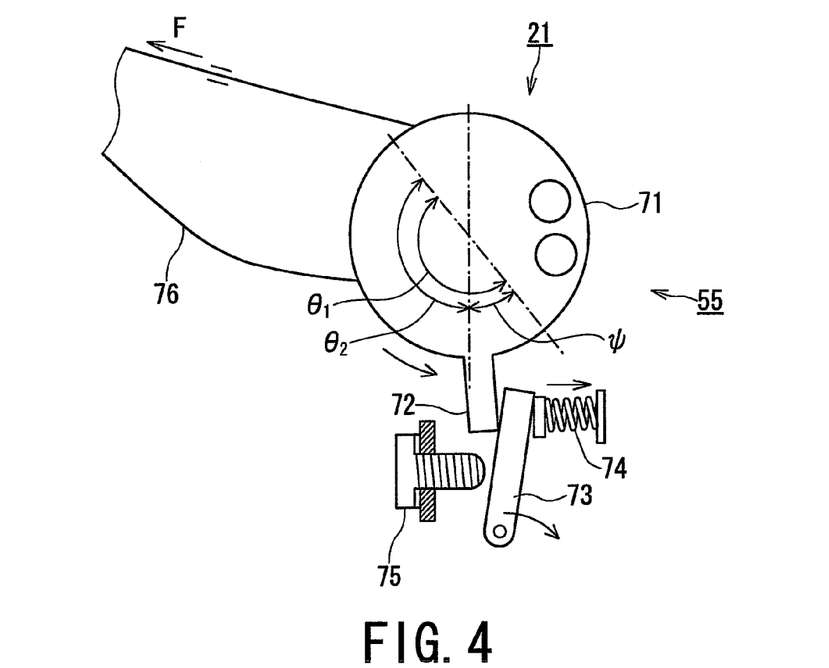
FIG. 4 is a view showing the accelerator grip excessive rotation mechanism unit of the vehicle control device according to the embodiment of present invention.

FIGS. 3 and 4 are views showing the accelerator grip excessive rotation mechanism unit of the vehicle control device according to the embodiment of present invention. FIG. 3 is a view showing a state where the accelerator grip is placed in the fully closed position, and FIG. 4 is a view showing a state where the accelerator grip is excessively rotated.

As shown in FIGS. 3 and 4, in the accelerator grip excessive rotation mechanism unit 55 of the vehicle control device 21, when a predetermined excessive rotation operational force F or more by the rider causes the accelerator grip 23 to enter the excessive rotation range ψ, the accelerator pulley 71 is also excessively rotated. Thus, the protrusion 72 abuts against the accelerator pulley stopper 73 and swings the accelerator pulley stopper 73 away from the fully closed adjustment screw 75.

When the electric control unit 26 receives the excessive rotation signal from the accelerator position sensor 56 after the control in the constant speed running state is started and then the cruise control is started, the electric control unit 26 automatically releases the cruise control and returns to the normal running control state.

When the accelerator grip 23 is excessively rotated to move the accelerator pulley stopper 73 away from the fully closed adjustment screw 75, the electric control unit 26 detects nonconductive states of the protrusion 72 on the accelerator pulley 71, the accelerator pulley stopper 73, and the fully closed adjustment screw 75.

Next, learning control in the fully closed position of the accelerator grip 23 by the electric control unit 26 will be described.

Figure 5:
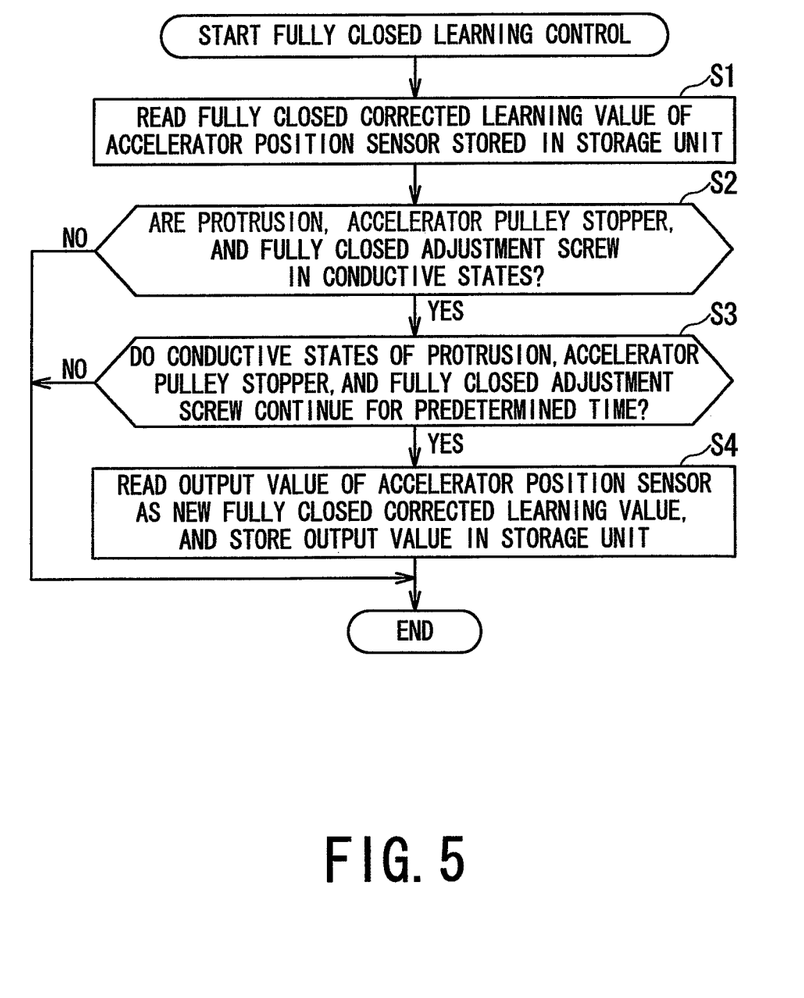
FIG. 5 is a flowchart showing fully closed learning control of the vehicle control device according to the embodiment of present invention.

FIG. 5 is a flowchart showing fully closed learning control of the vehicle control device according to the embodiment of present invention.

The accelerator grip 23 is placed in the fully closed position in a natural state without the rotation operation by the rider, and excessively rotated according to the predetermined excessive rotation operational force F or more by the rider. Then, the electric control unit 26 performs learning control in the fully closed position of the accelerator grip 23 to associate the fully closed position of the accelerator grip 23 with the output signal of the accelerator position sensor 56 for calibration.

As shown in FIG. 5, the electric control unit 26 of the vehicle control device 21 stores, in the storage unit 79 of the electric control unit 26, the output value of the accelerator position sensor 56 when the accelerator pulley stopper 73 is in contact with the protrusion 72 on the accelerator pulley 71 and the fully closed adjustment screw 75 as the fully closed position of the accelerator grip 23 during cranking operation of the motorcycle 1.

Noting that both the protrusion 72 and the fully closed adjustment screw 75 abut against the accelerator pulley stopper 73 when the accelerator grip 23 is placed in the fully closed position, the conductive states or the nonconductive states thereof are checked to determine whether the accelerator grip 23 is placed in the fully closed position.

Specifically, when an ignition key of the motorcycle 1 is turned on, the electric control unit 26 starts the learning control in the fully closed position of the accelerator grip 23.

First, in Step S1, the electric control unit 26 reads a fully closed corrected learning value of the accelerator position sensor 56 stored in the storage unit 79 when the ignition key of the motorcycle 1 is previously turned on. The fully closed corrected learning value of the accelerator position sensor 56 is the output value of the accelerator position sensor 56 corresponding to the fully closed position of the accelerator grip 23.

Then, in Step S2, the electric control unit 26 determines whether the protrusion 72 on the accelerator pulley 71, the accelerator pulley stopper 73, and the fully closed adjustment screw 75 are in the conductive states. When the protrusion 72 on the accelerator pulley 71, the accelerator pulley stopper 73, and the fully closed adjustment screw 75 are in the conductive states, the process proceeds to Step S3. In other cases, the process is finished.

Then, in Step S3, the electric control unit 26 determines whether the conductive states of the protrusion 72 on the accelerator pulley 71, the accelerator pulley stopper 73, and the fully closed adjustment screw 75 continue for a predetermined time T, for example, one to two seconds. When the conductive states of the protrusion 72 on the accelerator pulley 71, the accelerator pulley stopper 73, and the fully closed adjustment screw 75 continue for the predetermined time T, the process proceeds to Step S4. In other cases, the process is finished.

Then, in Step S4, the electric control unit 26 reads the output value of the accelerator position sensor 56 as a new fully closed corrected learning value of the accelerator position sensor 56, writes the value in the storage unit 79 so as to replace the previous fully closed corrected learning value, and the process is finished.

Figure 6:
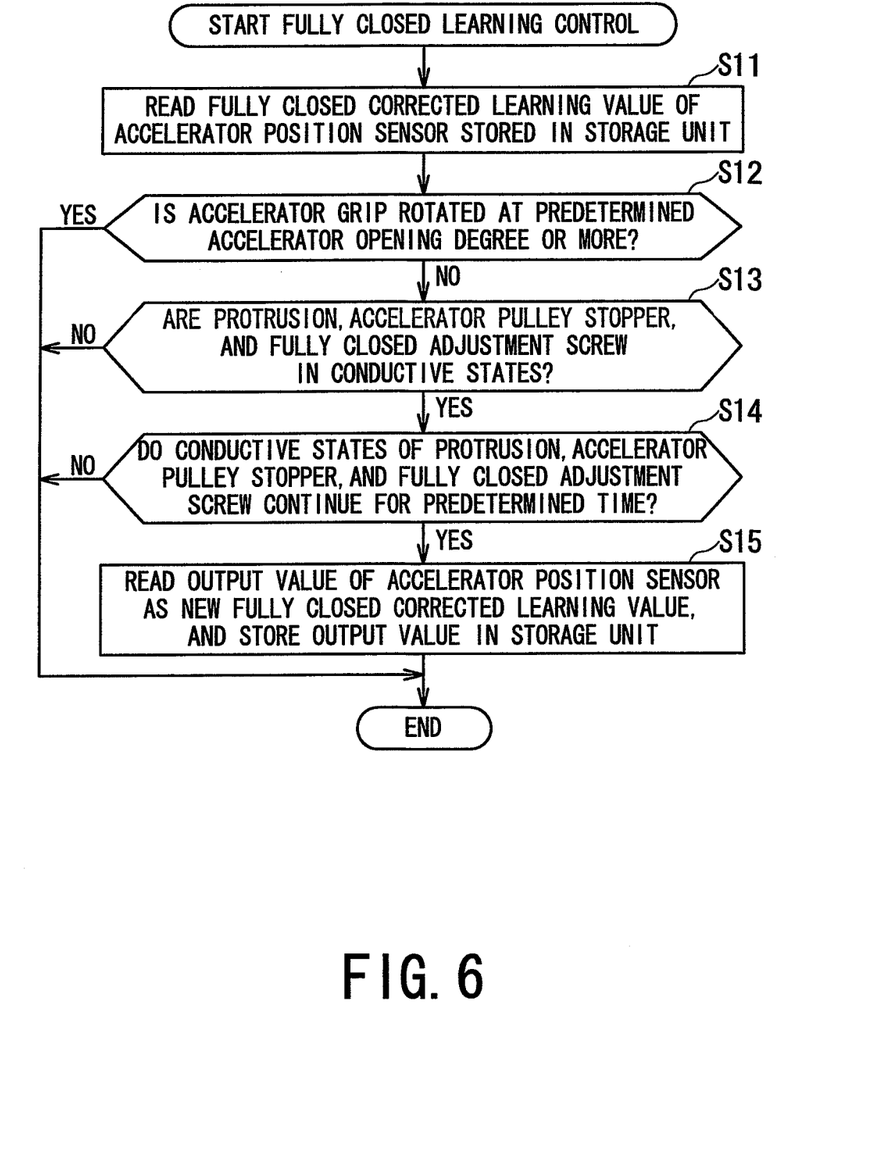
FIG. 6 is a flowchart showing another example of fully closed learning control of the vehicle control device according to the embodiment of present invention.

FIG. 6 is a flowchart showing another example of fully closed learning control of the vehicle control device according to the embodiment of present invention.

A process in Step S11 in FIG. 6 is the same as the process in Step S1 in FIG. 5, a process in Steps S13 to S15 in FIG. 6 is the same as the process in Steps S2 to S4 in FIG. 5, and thus repetitive descriptions will be omitted.

As shown in FIG. 6, the electric control unit 26 of the vehicle control device 21 stores, in the storage unit 79 of the electric control unit 26, the output value of the accelerator position sensor 56 when the accelerator pulley stopper 73 is in contact with the protrusion 72 on the accelerator pulley 71 and the fully closed adjustment screw 75 as the fully closed position of the accelerator grip 23 in case where the output value of the accelerator position sensor 56 is smaller than a predetermined value during cranking operation of the motorcycle 1.

Specifically, when the output value of the accelerator position sensor 56 is the predetermined value or more, it is apparent that the accelerator grip 23 is not placed in the fully closed position. Thus, the previous fully closed corrected learning value of the accelerator position sensor 56 is maintained and the process is finished before the electric control unit 26 checks the conductive states of the protrusion 72 on the accelerator pulley 71, the accelerator pulley stopper 73, and the fully closed adjustment screw 75.

Specifically, when the ignition key of the motorcycle 1 is turned on, the electric control unit 26 starts the learning control in the fully closed position of the accelerator grip 23.

In Step S12, the electric control unit 26 compares the output value of the accelerator position sensor 56 with the predetermined value, and determines whether the accelerator grip 23 is rotated at a predetermined accelerator opening degree or more, for example, an accelerator opening degree of 5% or more of a rotation amount from the fully closed position to the fully opened position. When the accelerator grip 23 is not rotated at the predetermined accelerator opening degree or more, the process proceeds to Step S13. In other cases, the process is finished.

The vehicle control device 21 thus configured can excessively rotate the accelerator grip 23 from the fully closed position according to the predetermined excessive rotation operational force F or more by the rider. Thus, even if the rider forgets the cruise control being performed because of careless driving or the like, the accelerator grip 23 is rotated in the closing direction and thus excessively rotated, and the vehicle control device 21 can detect a rider's intention to decelerate.

The vehicle control device 21 detects the excessive rotation of the accelerator grip 23 with the accelerator position sensor 56 to automatically release the cruise control. Thus, the cruise control can be reliably released in addition to a case of the operation of any of the front brake switch 59, the rear brake switch 60, and the clutch switch 61, and there is no possibility of delay of the deceleration operation of the motorcycle 1 during the cruise control.

Thus, according to the vehicle control device 21 of this embodiment, the accelerator grip 23 that can be excessively rotated from the normal fully closed position in the further closing direction can be configured, and the excessive rotation of the accelerator grip 23 can be detected to automatically release the cruise control.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A control device for a vehicle including an electronic throttle control system comprising:
an accelerator grip;
a biasing unit connected to the accelerator grip, the biasing unit biasing the accelerator grip to rotate in one circumferential direction;
a restricting unit restricting rotation of the accelerator grip against the biasing unit for placing the accelerator grip to a predetermined opening degree;
a control unit; and
an accelerator position sensor detecting a rotation amount of the accelerator grip,
wherein the restricting unit includes:
an accelerator pulley interlocked with the accelerator grip;
a protrusion formed on the accelerator pulley;
a stopper member against which the protrusion abuts when the accelerator grip is placed at the predetermined opening degree, the stopper member being swingable with excessive rotation of the accelerator grip; and
a stopper biasing member having a biasing force larger than a biasing force of the biasing unit, the stopper biasing member applying a rotation biasing force in a direction of the biasing force of the biasing unit via the stopper member to the accelerator pulley,
whereby the restricting unit releases restriction of the accelerator grip when a predetermined operational force or more in one circumferential direction is applied to the accelerator grip so as to excessively rotate the accelerator grip in one circumferential direction beyond the predetermined opening degree, the accelerator position sensor outputs an excessive rotation signal to the control unit when the accelerator position sensor detects excessive rotation of the accelerator grip, the control unit performs cruise control to maintain a vehicle speed at a predetermined speed, the control unit releases the cruise control when the excessive rotation signal is input from the accelerator position sensor, the excessive rotation signal is a signal indicating excessive rotation of the accelerator grip in a closing operation over predetermined opening degree thereof, and the regulation unit includes an opening degree adjustment unit that adjusts a swing amount of the stopper member and adjusts the predetermined opening degree of the accelerator grip.

2. The control device of a vehicle including an electronic throttle control system according to claim 1, further comprising a storage unit storing an output value of the accelerator position sensor, wherein the storage unit stores the output value as a fully closed position of the accelerator grip when the stopper member is in contact with the protrusion and the opening degree adjustment unit.

3. The control device for a vehicle including an electronic throttle control system according to claim 2, wherein the control unit stores the output value of the accelerator position sensor as the fully closed position of the accelerator grip during cranking operation of the vehicle.

4. The control device for a vehicle including an electronic throttle control system according to claim 2, wherein the control unit stores the output value of the accelerator position sensor as the fully closed position of the accelerator grip in case where the output value of the accelerator position sensor is smaller than a predetermined value.

5. The control device for a vehicle including an electronic throttle control system according to any one of claim 1, further comprising: an electric motor driven corresponding to an operation amount of the accelerator grip; and a throttle valve opened and closed by the electric motor, wherein the control unit controls the electric motor based on the output value of the accelerator position sensor.

* * * * *